United States Patent
Wheatley, III et al.

(10) Patent No.: US 6,741,661 B2
(45) Date of Patent: May 25, 2004

(54) METHOD AND APPARATUS FOR PEAK-TO-AVERAGE POWER REDUCTION

(75) Inventors: Charles E. Wheatley, III, Del Mar, CA (US); Rashid A. Attar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 150 days.

(21) Appl. No.: 09/863,244

(22) Filed: May 22, 2001

(65) Prior Publication Data

US 2002/0176480 A1 Nov. 28, 2002

(51) Int. Cl.[7] .............................................. H04L 25/49
(52) U.S. Cl. ....................................................... 375/296
(58) Field of Search ................................. 375/296, 285; 332/159

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,287,387 A * | 2/1994 | Birchler .................. 375/296 |
| 6,175,551 B1 * | 1/2001 | Awater et al. ............ 370/210 |

FOREIGN PATENT DOCUMENTS

GB    2315379    1/1998

* cited by examiner

*Primary Examiner*—Stephen Chin
*Assistant Examiner*—Kevin Kim
(74) *Attorney, Agent, or Firm*—Philip Wadsworth; Sandra L. Godsey; Albert J. Harnois, Jr.

(57) ABSTRACT

A method and system that reduces the peak-to-average power ratio of a reverse link signal is described. A baseband structure implements a peak reduction technique using peak windowing. A non-rectangular window is used to distort the signal. One embodiment of the window is an inverted-raised cosine with the peak reduction a function of the relative difference in the squared-magnitude of the envelope relative to that of the desired peak-to-average power ratio. Multiple passes through the peak-reduction function may be performed until a desired target peak-to-average power ratio is achieved.

13 Claims, 6 Drawing Sheets

PEAK-TO-AVERAGE POWER REDUCTION USING PEAK-WINDOWING FLOWCHART

FIG. 8

METHOD AND APPARATUS FOR PEAK-TO-AVERAGE POWER REDUCTION

BACKGROUND

1. Field

The present invention relates generally to telecommunications, and more specifically to a novel and improved method and apparatus for reducing a peak-to-average power ratio of a reverse link signal.

2. Background

Communication systems that consist of independently modulated channels can result in a high peak-to-average power ratio. Reverse link channels in cdma2000 (1x) and cdma2000 (1x-EV) systems are examples of independently modulated channels. Reverse-link signals are those signals that are sent from a subscriber unit to an infrastructure element in a wireless communication system. A high peak-to-average power ratio results in reduced efficiencies for a subscriber unit's RF power amplifier (hereinafter power amplifier). For example, a high peak-to-average amplitude waveform places greater demands on the power amplifier of a subscriber unit's transmitter and can reduce the maximum data rate or maximum range at which a subscriber unit can operate. This is due to several factors, the most important of which is that a waveform with a higher peak-to-average power ratio by definition transmits a larger maximum power for the same average transmit power. Therefore, a power amplifier with a greater linear range is required and these kinds of power amplifiers tend to be more expensive. In addition, a larger maximum power requires more current, which reduces subscriber unit battery life. Thus, a high peak-to-average power ratio results in the reduced battery life of a subscriber unit.

It is desirable to reduce the peak-to-average power ratio of the reverse link signal because a benefit of reducing the peak-to-average power ratio is a longer battery life. Another benefit of a lower peak-to-average power ratio is reduced backoff from a power amplifier compression point, which results in greater average transmit power or greater range. Amplitude and phase non-linearity of power amplifiers, known as AM/AM & AM/PM non-linearity, respectively, results in an inter-modulation distortion and requires operation of amplifiers much below a power amplifier's compression point. A one dB output compression point of a power amplifier is an output power level at which gain deviates from an output signal gain by one dB. For example, a one dB output compression point is the output power level at which a ten dB increase in input power results in only a nine dB increase in output power.

A reduced peak-to-average power ratio can manifest itself as either greater range (i.e., more average output power) and/or increased battery life for a given level of average power (peak power transmissions use more current).

One simple method to reduce the peak-to-average power ratio is to clip a signal such that the amplitude and consequently the peak-to-average power ratio are limited to some acceptable maximum level. Bandwidth regrowth or out-of-band leakage due to clipping is a critical issue for wireless systems. The amount of out-of-band spill determines filtering requirements and adjacent channel interference.

Clipping in the time domain is convolving a rectangular pulse with a power spectrum of a reverse-link transmit waveform in the frequency domain. Therefore, clipping introduces a significant amount of in-band noise as well as out-of-band spurious emissions and consequently does not meet the spurious emissions requirements outlined in the "TIA/EIA-98-D Recommended Minimum Standard for Dual-Mode Wideband Spread Spectrum Cellular Mobile Station" (the IS-98 standard).

Thus, there is a need in the art for a method and apparatus to reduce the peak-to-average power ratio of a reverse link signal while limiting in-band noise as well as out-of-band spurious emissions.

SUMMARY

Embodiments disclosed herein address the need to reduce the peak-to-average power ratio of a reverse-link signal. Reducing the peak-to-average power ratio of the reverse-link signal increases coverage range/distance at which a subscriber unit can successfully operate and/or the battery life of a subscriber unit.

In one aspect, an apparatus comprises a peak-to-average reduction module and a power amplifier. The peak-to-average reduction module is configured to generate a reduced peak-to-average signal in response to peaks in a signal that exceed a target threshold value by applying a reduction function to the signal until the peaks are reduced to or below the target threshold value, or the reduction function has been applied a given number of times. The power amplifier is configured to amplify the reduced peak-to-average signal and to generate an amplified signal. In one aspect, the apparatus is a subscriber unit. In one aspect, the signal is a CDMA signal. In one aspect, the reduction function is an inverted raised cosine function.

In one aspect, the apparatus comprises a reverse link modulator configured to provide channel data, a channel gain calculation module coupled to the reverse link modulator and configured to compute reverse link channel gain, an averaging module that is coupled to the channel gain calculation module and configured to calculate average power for a combination of independent channels on the reverse link, a threshold module coupled to the averaging module and configured to generate envelope thresholds using a target peak-to-average ratio and the average power, a window weight module coupled to the threshold module and configured to align a peak reduction window with a waveform peak and generates window weights to be used for multiplying with filtered samples, a filter coupled to the reverse link modulator and configured to filter an n-chip (where n is an integer) sample of channel data to generate filtered samples, and a multiply module coupled to the filter and configured to multiply the filtered samples at n times a chip rate with an aligned peak window using the window weights from the window weight module to create modified samples with a reduced peak-to-average power ratio.

In one aspect, a method of processing a signal comprises comparing a peak of the signal to a target threshold value, applying a reduction function to the peak if the peak is above the target threshold value until the reduction function is at or below the target threshold value to generate a reduced peak-to-average signal, and terminating application of the reduction function once the reduction function has been applied a given number of times.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

A subscriber unit (SU) (also called subscriber station, mobile station, mobile, remote station, remote terminal, access terminal, and user equipment), may be mobile or stationary, and may communicate with one or more base stations (BSs) (also called base transceiver systems (BTSs), base station transceivers, access points, Node B, and modem pool transceivers (MPTs)).

Figure 1:
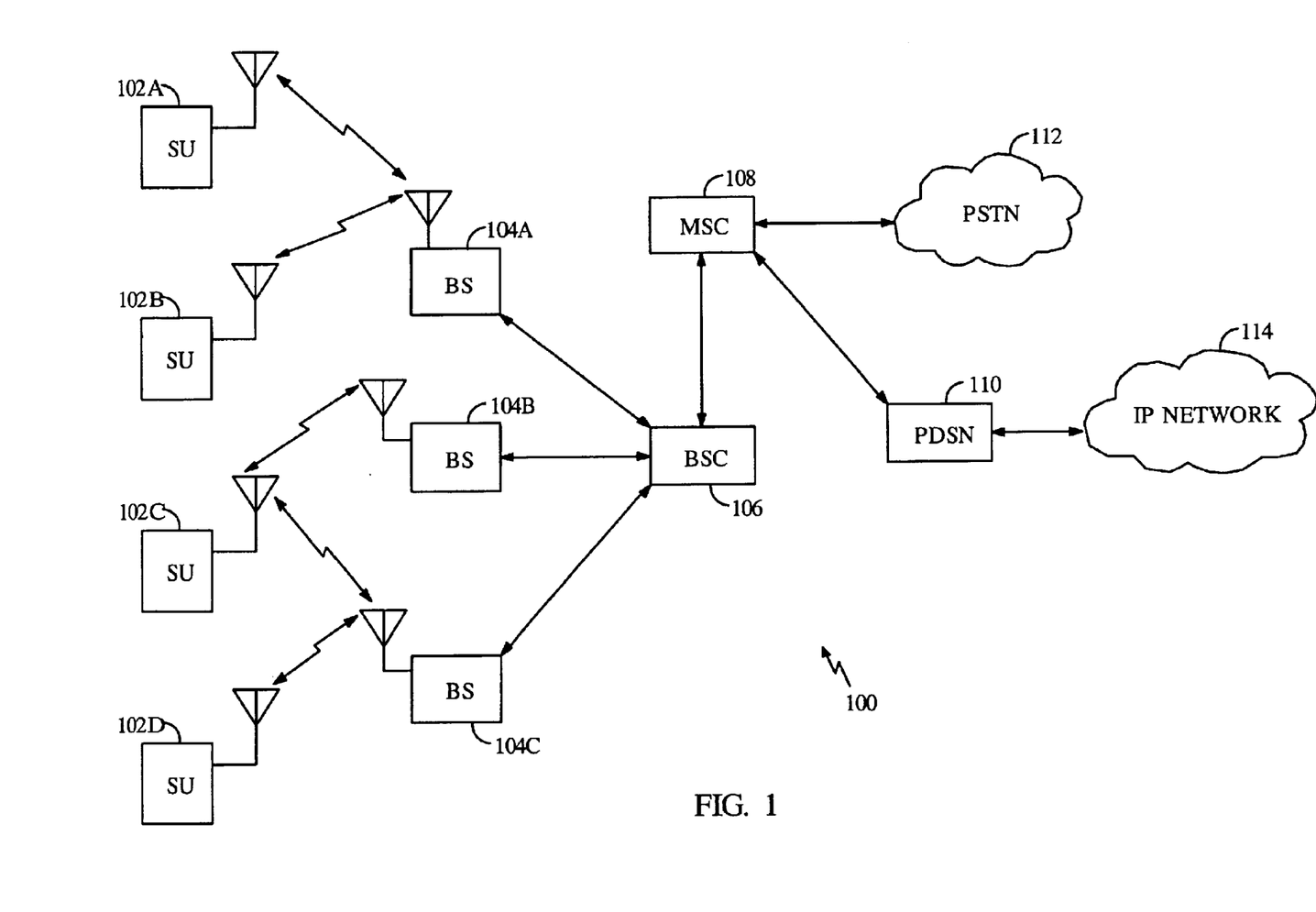
FIG. 1 is a diagram of an exemplary wireless communication network that supports a number of users and is capable of implementing various aspects of the invention.

FIG. 1 is a diagram of an exemplary wireless communication network 100 that supports a number of users and is capable of implementing various aspects of the invention. For purposes of example the exemplary embodiment is described herein within the context of a CDMA cellular communications system. However, it should be understood that the invention is applicable to other types of communication systems, such as personal communication systems (PCS), wireless local loop, private branch exchange (PBX), or other known systems. Furthermore, systems utilizing other well known multiple access schemes such as TDMA and FDMA as well as other spread spectrum systems may employ the presently disclosed method and apparatus.

The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein.

A wireless communication network 100 generally includes a plurality of subscriber units 102a–102d, a plurality of base stations 104a–104c, a base station controller (BSC) 106 (also called radio network controller or packet control function), a mobile station controller (MSC) or switch 108, a packet data serving node (PDSN) or internetworking function (IWF) 110, a public switched telephone network (PSTN) 112 (typically a telephone company), and a packet network 114 (typically the Internet). For purposes of simplicity, four subscriber units 102a–102d, three base stations 104a–104c, one BSC 106, one MSC 108, and one PDSN 110 are shown with a PSTN 112 and an IP network 114. It would be understood by those skilled in the art that there could be any number of subscriber units 102, base stations 104, BSCs 106, MSCs 108, and PDSNs 110 in the wireless communication network 100.

Wireless communication network 100 provides communication for a number of cells, with each cell being serviced by a corresponding base station 104. Various subscriber units 102 are dispersed throughout the system. The wireless communication channel through which information signals travel from a subscriber unit 102 to a base station 104 is known as a reverse link. The wireless communication channel through which information signals travel from a base station 104 to a subscriber unit 102 is known as a forward link. Each subscriber unit 102 may communicate with one or more base stations 104 on the forward and reverse links at any particular moment, depending on whether or not the subscriber unit is in soft handoff.

As shown in FIG. 1, base station 104a communicates with subscriber units 102a and 102b, base station 104b communicates with subscriber unit 102c, and base station 104c communicates with subscriber units 102c and 102d. Subscriber unit 102c is in soft handoff and concurrently communicates with base stations 104b and 104c.

In wireless communication network 100, a BSC 106 couples to base stations 104 and may further couple to a PSTN 112. The coupling to PSTN 112 is typically achieved via an MSC 108. BSC 106 provides coordination and control for the base stations coupled to it. BSC 106 further controls the routing of telephone calls among subscriber units 102, and between subscriber units 102 and users coupled to the PSTN (e.g., conventional telephones) 112 and to the packet network 114, via base stations 104.

In one embodiment, the wireless communication network 100 is a packet data services network. In one embodiment, the BSC 106 is coupled to a packet network via a PDSN 110. An Internet Protocol (IP) network is an example of a packet network that can be coupled to BSC 106 through PDSN 110. In one embodiment, the coupling of BSC 106 to PDSN 110 is achieved via an MSC 108.

In one embodiment, the IP network 114 is coupled to the PDSN 110, the PDSN 110 is coupled to the MSC 108, the MSC 108 is coupled to the BSC 106 and the PSTN 112, and the BSC 106 is coupled to the base stations 104a–104c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In another embodiment, the BSC 106 is coupled directly to the PDSN 110, and the MSC 108 is not coupled to the PDSN 110. In one embodiment, the subscriber units 102a–102d communicate with the base stations 104a–104c over an RF interface.

The subscriber units 102a–102d may advantageously be configured to perform one or more wireless packet data protocols. In one embodiment, the subscriber units 102a–102d generate IP packets destined for the IP network 114 and encapsulate the IP packets into frames using a point-to-point protocol (PPP).

The subscriber units 102a–102d may be any of a number of different types of wireless communication devices such as a portable phone, a cellular telephone that is connected to a laptop computer running IP-based, Web-browser applications, a cellular telephone with an associated hands-free car kit, a personal digital assistant (PDA) running IP-based, Web-browser applications, a wireless communication module incorporated into a portable computer, or a fixed location communication module such as might be found in a wireless local loop or meter reading system. In the most general embodiment, subscriber units may be any type of communication unit.

During typical operation of the wireless communication network 100, the base stations 104a–104c receive and demodulate sets of reverse-link signals from various subscriber units 102a–102d engaged in telephone calls, Web browsing, or other data communications. Each reverse-link signal received by a given base station 104a–104c is processed within that base station 104a–104c. Each base station 104a–104c may communicate with a plurality of subscriber units 102a–102d by modulating and transmitting sets of forward-link signals to the subscriber units 102a–102d. For example, as shown in FIG. 1, the base station 104a communicates with subscriber units 102a and 102b simultaneously, and base station 104c communicates with subscriber units 102c and 102d simultaneously. The resulting packets are forwarded to the BSC 106, which provides call resource allocation and mobility management functionality including the orchestration of soft handoffs of a call for a particular subscriber unit 102a–102d from an originating base station 104a–104c to destination base station 104a–104c. Eventually, when the subscriber unit 102c moves far enough away from base station 104c, the call will be handed off to another base station. If subscriber unit 102c moves close enough to base station 104b, the call will be handed off to base station 104b.

If the transmission is a conventional telephone call, the BSC 106 will route the received data to the MSC 108, which provides additional routing services for interface with the PSTN 112. If the transmission is a packet-based transmission such as a data call destined for the IP network 114, the MSC 108 will route the data packets to the PDSN 110, which will send the packets to the IP network 114. Alternatively, the BSC 106 will route the packets directly to the PDSN 110, which sends the packets to the IP network 114.

System 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the documents offered by a consortium named "3rd Generation Partnership Project 2" (3GPP2) and embodied in a set of documents including Document Nos. C.S0002-A, C.S0005-A, C.S0010-A, C.S0011-A. C.S0024, C.S0026, C.P9011, and C.P9012 (the cdma2000 standard). In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Figure 2:
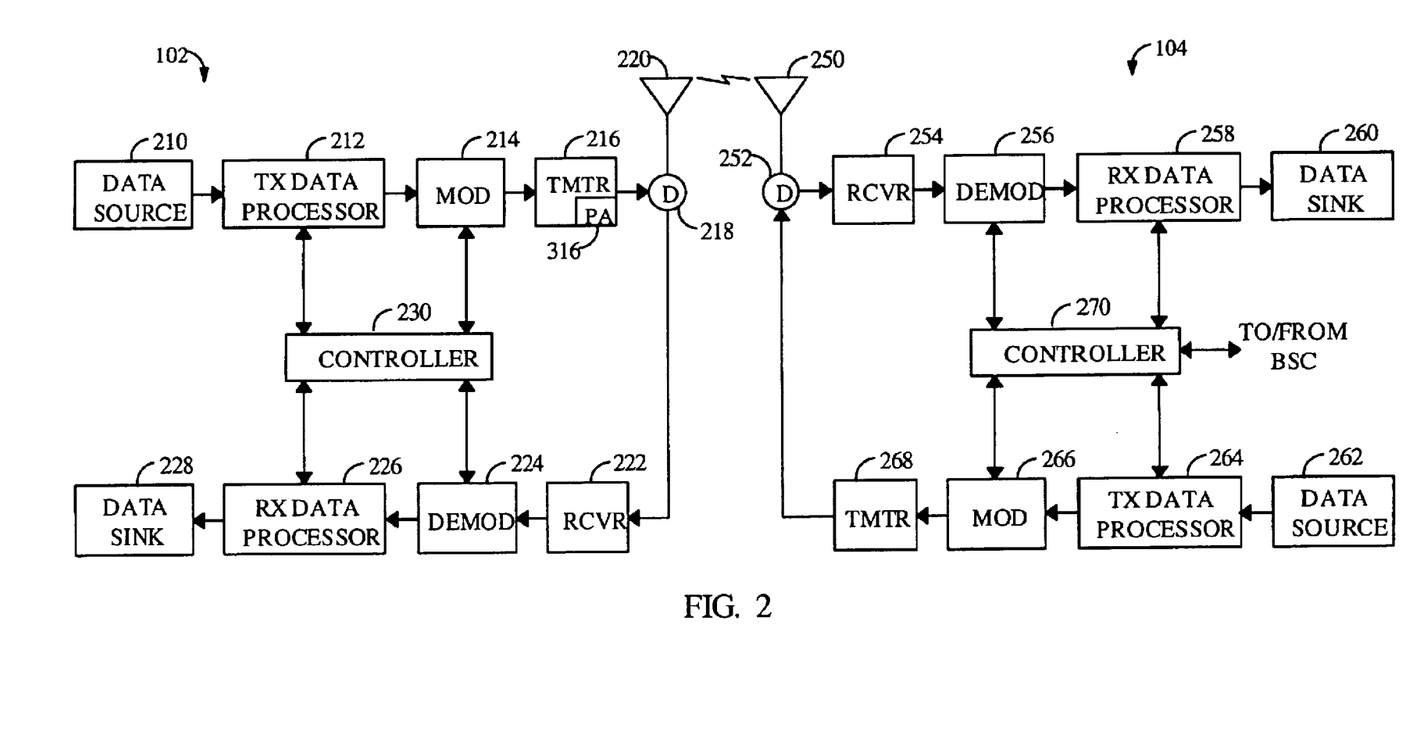
FIG. 2 is a simplified block diagram of a subscriber unit and a base station, which are capable of implementing various aspects of the invention.

FIG. 2 is a simplified block diagram of an embodiment of subscriber unit 102 and a base station 104, which are capable of implementing various aspects of the invention. For a particular communication, voice data, packet data, and/or messages may be exchanged between a subscriber unit 102 and a base station 104. Various types of messages may be transmitted such as messages used to establish a communication session between the base station 104 and the subscriber unit 102 and messages used to control a data transmission (e.g., power control, data rate information, acknowledgment, and so on).

For the reverse link, at subscriber unit 102, voice and/or packet data (e.g., from a data source 210) and messages (e.g., from a controller 230) are provided to a transmit (TX) data processor 212, which formats and encodes the data and messages with one or more coding schemes to generate coded data. The transmit data processor 212 includes a code generator that implements the one or more coding schemes. Output digits of the code generator are commonly termed chips. A chip is a single binary digit. Thus, a chip is an output digit of the code generator.

Each coding scheme may include any combination of cyclic redundancy check (CRC), convolutional, Turbo, block, and other coding, or no coding at all. Typically, voice data, packet data, and messages are coded using different schemes, and different types of message may also be coded differently.

The coded data is then provided to a modulator (MOD) 214 and further processed (e.g., covered, spread with short PN sequences, and scrambled with a long PN sequence assigned to the user terminal). In one embodiment, the coded data is covered with Walsh codes, spread with a long PN code, and further spread with short PN codes. The spread data is then provided to a transmitter unit (TMTR) 216 and conditioned (e.g., converted to one or more analog signals, amplified, filtered, and quadrature modulated) to generate a reverse link signal. Transmitter unit 216 includes a power amplifier 316 that amplifies the one or more analog signals. The reverse link signal is routed through a duplexer (D) 218 and transmitted via an antenna 220 to base station 104.

The transmission of the reverse link signal occurs over a period of time called transmission time. Transmission time is partitioned into time units. In one embodiment, the transmission time may be partitioned into frames. In another embodiment, the transmission time may be partitioned into time slots. A time slot is a duration of time. In accordance with one embodiment, data is partitioned into data packets, with each data packet being transmitted over one or more time units. At each time unit, the base station can direct data transmission to any subscriber unit, which is in communication with the base station. In one embodiment, frames may be further partitioned into a plurality of time slots. In yet another embodiment, time slots may be further partitioned. For example, a time slot may be partitioned into half-slots and quarter-slots.

In one embodiment, the modulator 214 includes a peak-to-average reduction module that reduces the peak-to-average power ratio of the reverse link signal. Within the modulator 214, the peak-to-average reduction module is located after the spread data is filtered. In another embodiment, the peak-to-average reduction module is located within the transmitter 216. In yet another embodiment, the peak-to-average reduction module is located between the modulator 214 and the transmitter 216.

At base station 104, the reverse link signal is received by an antenna 250, routed through a duplexer 252, and provided to a receiver unit (RCVR) 254, which conditions (e.g., filters, amplifies, downconverts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at subscriber unit 102. Demodulator 256 and RX data processor 258 may further be operated to process multiple transmissions received via multiple channels, e.g., a reverse fundamental channel (R-FCH) and a reverse supplemental channel (R-SCH). Also, transmissions may be received simultaneously from multiple subscriber units 102, each of which may be transmitting on a reverse fundamental channel, a reverse supplemental channel, or both.

On the forward link, at base station 104, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to subscriber unit 102.

At subscriber unit 102, the forward link signal is received by antenna 220, routed through duplexer 218, and provided to a receiver unit 222. Receiver unit 222 conditions (e.g., downconverts, filters, amplifies, quadrature demodulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

Figure 3:
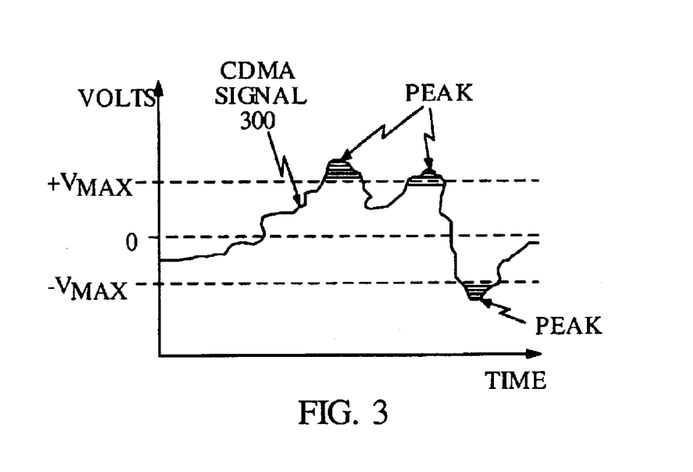
FIG. 3 illustrates an exemplary CDMA signal.

FIG. 3 illustrates an exemplary CDMA signal 300. The vertical axis represents CDMA signal amplitude in volts, and the horizontal axis represents time. The dashed lines represent a maximum positive signal voltage (+Vmax) above the zero voltage point, and a negative maximum signal voltage (−Vmax) below the zero voltage point. The CDMA signal 300 has "peaks" above and below the Vmax voltages. The peaks are shaded in FIG. 3. The peak-to-average reduction module eliminates or reduces the peaks in the CDMA signal 300.

The CDMA signal 300 comprises multiple individual user signals that are each encoded with random sequences. The result of multiple users and random sequences is peaks that are not typically present in other communication signals. In order to transmit these peaks without clipping, not only must a D/A converter (used prior to the Power Amplifier 316) have enough bits to accommodate the peaks, but the power amplifier 316 must remain linear over an amplitude range that includes the peak amplitudes.

Figure 4:
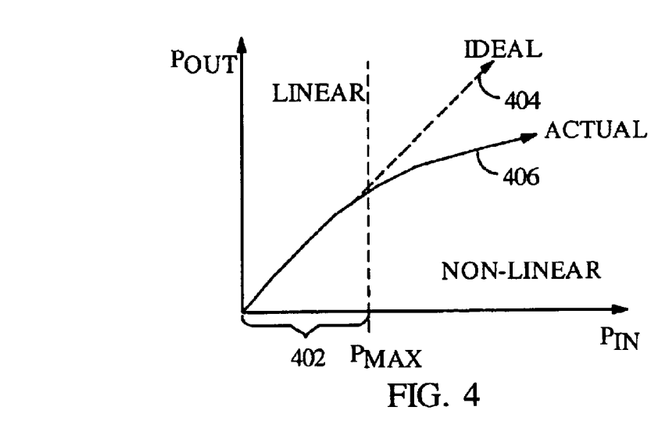
FIG. 4 illustrates operating characteristics of a typical power amplifier used to amplify a CDMA signal.

FIG. 4 illustrates the operating characteristics of a typical power amplifier 316 used to amplify a CDMA signal. For example, the power amplifier might be in the transmitter 216. The horizontal axis represents the input signal power ($P_{in}$), and the vertical axis represents the output signal power ($P_{out}$). If $P_{in}$ is below a maximum power level (Pmax), then the power amplifier 316 operates in a linear manner where an increase in Pin is matched by a proportional increase in Pout as shown in linear region 402. If Pin is above Pmax, then the power amplifier 316 operates in a nonlinear manner where an increase in Pin is not matched by a proportional increase in Pout. Pout is less than ideal in the nonlinear operating range. Line 404 shows an ideal linear line. Line 406 shows an actual line that represents the nonlinear region of a power amplifier 316.

Pmax can be set based on various factors, such as: (1) worst-case channel configuration, (2) ratio of in-band to out-of-band signal power, temperature, i.e. lower during a cold start, the ratio of bit energy to interference and noise $E_b/I_o$, (3) the IS-97 industry standard Rho metric that is used to measure waveform fidelity, and/or (4) other suitable metrics. Pmax can be adjusted during system operation based on ongoing measurements of desired metrics and corresponding adjustment of Pmax to optimize performance.

Taking FIGS. 3 and 4 together, it should be noted that the Vmax voltage levels on FIG. 3 correspond to the Pmax on FIG. 4. Thus, the peaks above +Vmax and below and −Vmax would drive the power amplifier 316 above Pmax into the nonlinear operating range. When operated in the nonlinear range, the power amplifier 316 exhibits undesirable performance in the form of decreased fidelity and increased noise. Peak-to-average power reduction eliminates or reduces the operation of the power amplifier 316 in the nonlinear range.

Figure 5:
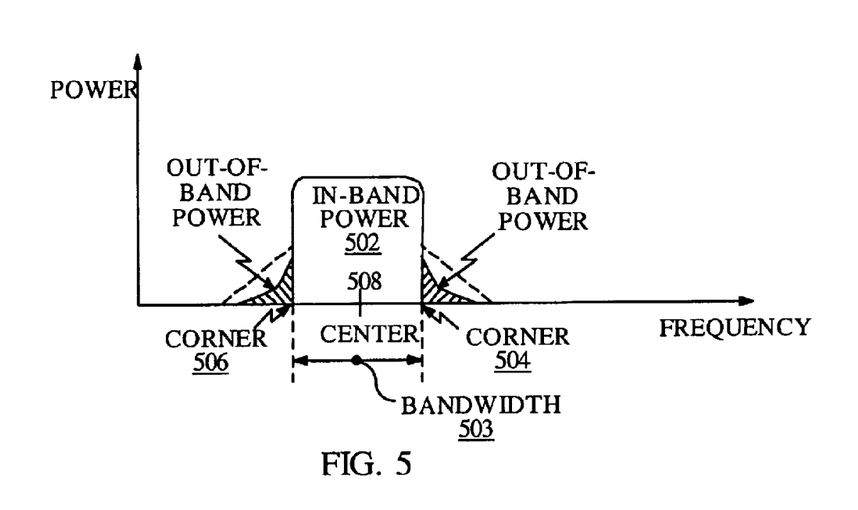
FIG. 5 illustrates frequency characteristics of a CDMA signal.

FIG. 5 illustrates the frequency characteristics of a CDMA signal 300. The vertical axis represents signal power, and the horizontal axis represents frequency. The desired "in-band" signal power 502 is contained within the bandwidth 503 defined by corner frequencies 504, 506 that are above and below a center frequency 508. Corner frequency 504 is above the center frequency 508 and corner frequency 506 is below the center frequency 508. An exemplary bandwidth is a 1.25 MHz bandwidth centered about a center frequency. The signal power drops significantly outside of the bandwidth, but some undesired "out-of-band" signal power is still present and is shaded in FIG. 5. Out-of band signal power is undesirable because it represents wasted power that interferes with other signals in neighboring frequency bands. The power amplifier 316 generates significant out-of-band signal power when it operates in the non-linear range. The dashed lines above the shaded out-of-band power on FIG. 5 represent the increased out-of-band signal power generated when peak-to-average power reduction is not used.

When FIGS. 3–5 are taken together, it can be appreciated that the CDMA signal peaks on FIG. 3 drive the power amplifier 316 above Pmax on FIG. 4 and cause the power amplifier 316 to generate undesirable out-of-band signal power shown by the dashed lines on FIG. 5. The peak-to-average reduction module reduces the CDMA signal peaks and corresponding out-of-band signal power to the shaded area on FIG. 5. This reduction is typically offset by operating the power amplifier 316 at a higher power level. Advantageously, the power amplifier 316 has greater range or capacity at the higher power level, but does not generate intolerable out-of-band signal power.

Figure 6:
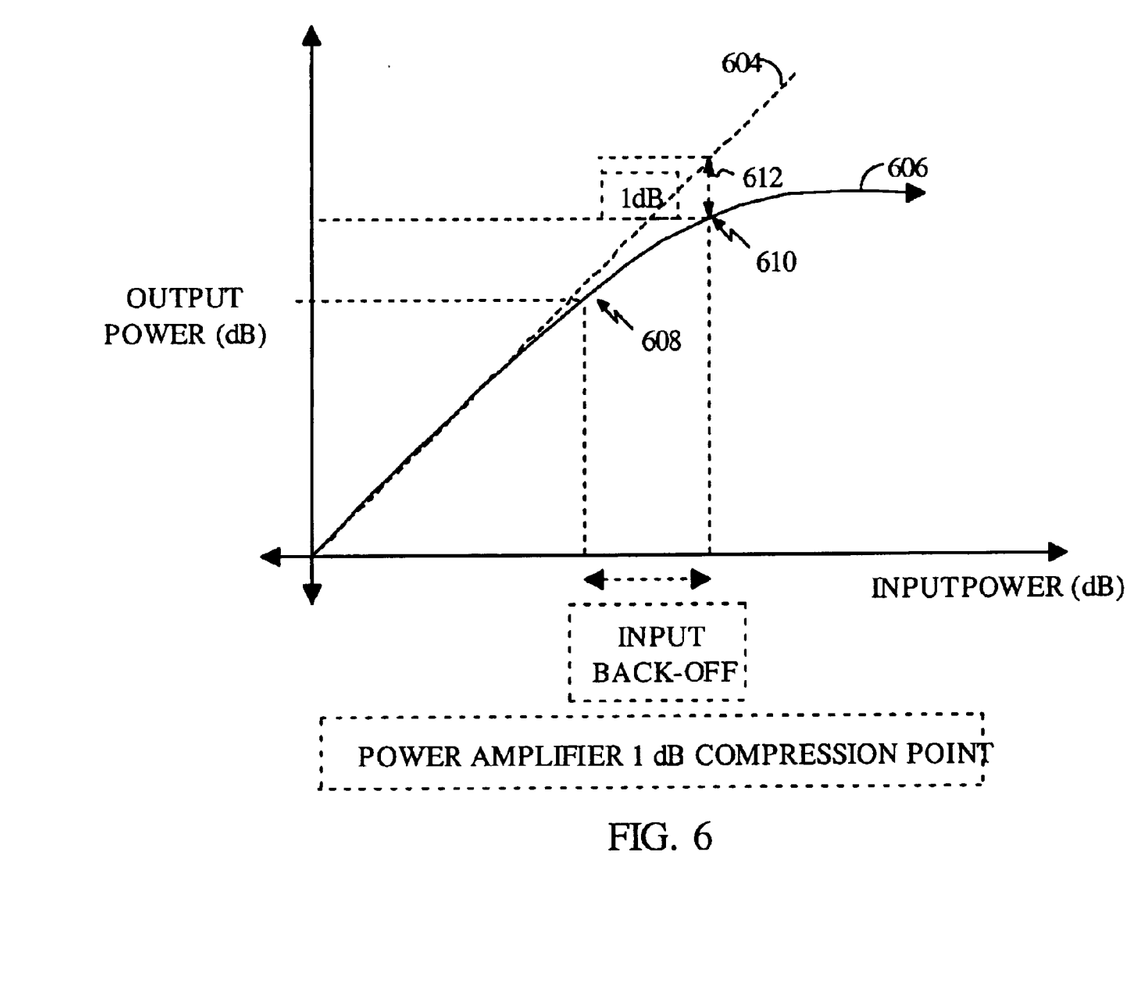
FIG. 6 is a graph of power amplifier backoff.

FIG. 6 is a graph of power amplifier 316 backoff. The horizontal axis is input power in dB and the vertical axis is output power in dB. Line 604 shows an ideal linear line wherein an increase in input power is matched by an increase in output power. However, line 606 is an actual line that shows a nonlinear region of a power amplifier 316, wherein an increase in input power is not matched by a corresponding increase in output power. Point 608 reflects a linear region of the power amplifier 316. A marginal increase in input power is matched by an equal increase in output power. As input power increases from point 608 to point 610, the increase in output power is one dB lower (shown as length 612) than the increase in input power. Point 610 is the power amplifier 316's one-dB compression point. When a reduced peak-to-average power ratio algorithm is applied to the reverse-link signal, the compression point 610 is backed off to point 608. Input backoff is the decrease in the amount of input power and output backoff is the decrease in output power.

Figure 7:
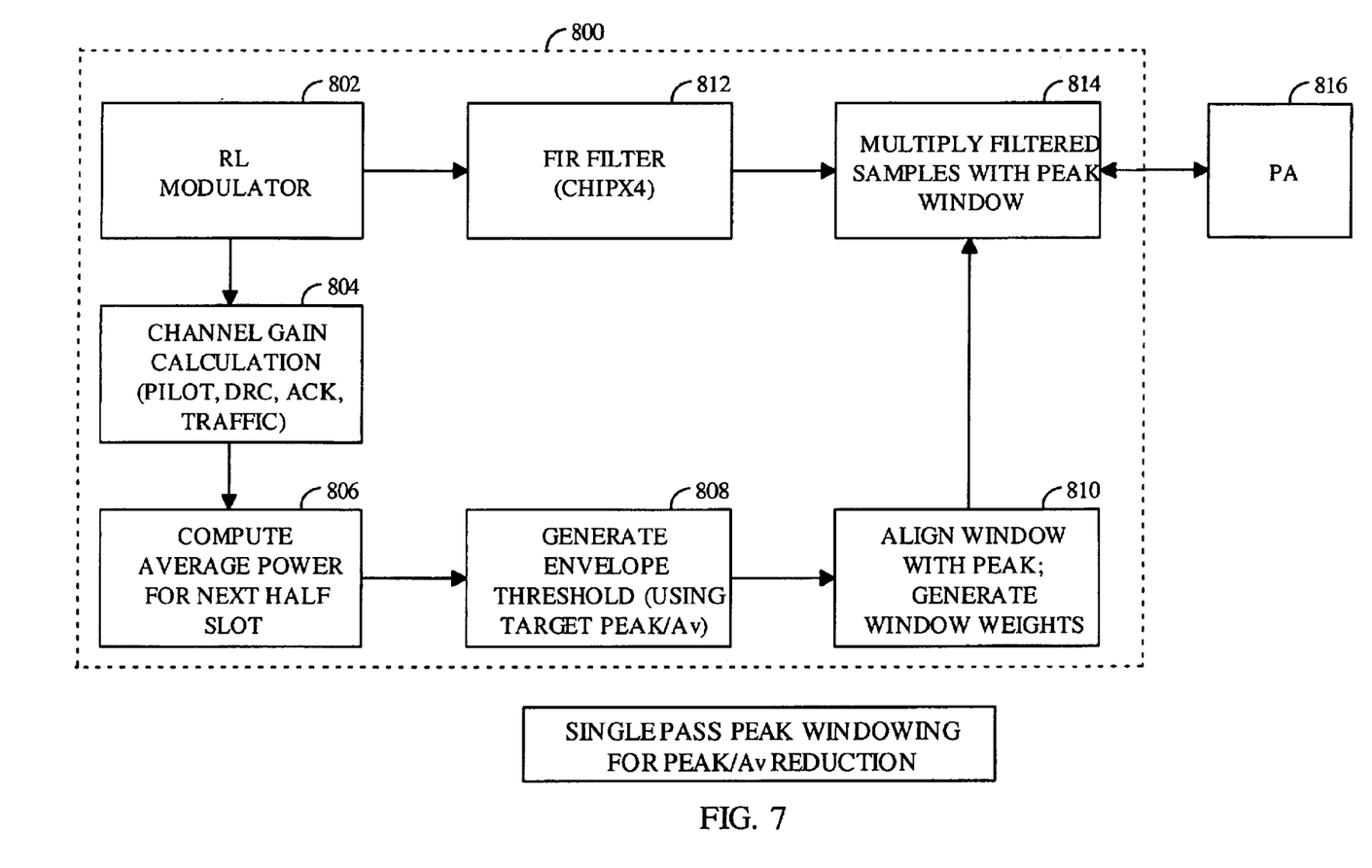
FIG. 7 is a simplified block diagram of a peak-to-average reduction module for reducing the peak-to-average power ratio of a reverse link signal in accordance with one embodiment.

FIG. 7 is a simplified block diagram of a peak-to-average reduction module 800 in accordance with one embodiment.

The peak-to-average reduction module 800 may be implemented as a baseband structure that reduces the peak-to-average power ratio of the reverse link signal. The peak-to-average reduction module 800 may implement a signal distortion technique using peak windowing. This technique advantageously meets the spurious emissions requirements outlined in the IS-98 standard and the cdma2000 standard with some margin for power amplifier 816 distortion. In addition, this technique meets rho specifications in the cdma2000 standard. The rho specifications govern the maximum attainable signal-to-noise ratio (SNR). Rho is a measure of signal quality.

In one embodiment, a non-rectangular window may be used to distort the signal. The window may be an inverted-raised cosine with the peak reduction being a function of the relative difference between a signal envelope and the desired peak-to-average power ratio. This technique introduces a delay that at its maximum is equal to that of the window size. A signal envelope is the magnitude of the signal.

In one embodiment, the baseband structure 800 is located within the modulator 214. In another embodiment, the baseband structure 800 is located between the modulator 214 and the transmitter 216. In yet another embodiment, the baseband structure 800 is located within the transmitter 216 before the transmitter's power amplifier 816.

Reverse link modulator 802 provides channel data to a channel gain calculation module 804. Channel gain calculation module 804 computes the gains for the reverse link channels in any given configuration. A configuration is a combination of independent channels on the reverse link. For example, in a configuration with four reverse link channels, each being covered with independent Walsh codes, the channel gain calculation module 804 scales all four reverse link channels. Thus, in a cdma2000 system with a pilot channel, a data request (DRC) channel, an acknowledgment (ACK) channel, and traffic channels, the channel gain calculation module 804 computes the gain for the Pilot channel, DRC channel, ACK channel, and traffic channels in accordance with one embodiment. It would be apparent to those skilled in the art that any data channel may be scaled by the channel gain calculation module 804.

In one embodiment, averaging module 806 calculates average power $P_{av}$ for a next half-slot in dB based on reverse link configuration. Threshold module 808 takes as its input a target peak-to-average power ratio, which is a desired peak-to-average power ratio in dB and generates envelope thresholds using the target peak-to-average power ratio and average power $P_{av}$. Window weight module 810 aligns a window with the peak and generates actual window weights to be used for multiplying filtered samples.

A pulse-shaping filter 812 continually filters samples at a chip rate n (n is type integer) from the reverse link modulator 802. In one embodiment, the pulse-shaping filter 812 is a Finite Impulse Response (FIR) filter. The filter 812 upsamples its input, an n-chip sample of channel data, to generate output samples that are at a multiple m sample rate (m is type integer) of the chip rate. Thus, the filter generates output samples that are n×m chips in duration. For example, if the chip rate is four and the filter 812 upsamples at a sample rate of six, then an output sample of the filter is twenty-four chips in duration.

The multiply module 814 using a peak windowing algorithm, multiplies the filtered samples, i.e., the output samples from the filter 812, with an aligned peak window using the actual window weights from the window weight module 810, to create modified samples. The peak windowing algorithm is applied to the filter 812 output samples.

In one embodiment, the filter 812 upsamples its input at four times the chip rate to generate output samples that are four times the chip rate (chip×4). In one embodiment, the aligned peak window may be w (where w is an integer) chip×4 samples wide. An aligned peak window can be 1, 2, 4, 8, or 16 chip×4 samples wide, for example. The variable "w" can be any integer within reason (reasonable given the application) and is not constrained to be a power of two.

If the target peak-to-average power ratio has been reached, the reverse link signal is passed to a power amplifier within the transmitter 216. If the modified samples have a peak-to-average power ratio that is greater than the desired peak-to-average power ratio, then the peak windowing algorithm is re-applied. In one embodiment, the peak windowing algorithm is re-applied to the samples within a given window. In another embodiment, the peak windowing algorithm is re-applied to samples of the adjacent window. The peak windowing algorithm is re-applied until the target peak-to-average power ratio or a lower than target peak-to-average power ratio is achieved or the maximum number of iterations is reached.

In one embodiment, the average signal power changes on half-slot boundaries in the case of HDR (1x-EVDO) and is consequently known in advance by the TX Data Processor 212. Similarly, in another embodiment, in 1x-voice (cdma2000), the average power changes on frame boundaries. Therefore, the average power is known prior to transmission of the reverse link signal and can be used for comparison with a squared magnitude of individual samples. In a cdma2000 (1x-EV), embodiment, gains change every half-slot. It would be understood by those skilled in the art that the average signal power can change on any boundary.

The peak-to-average reduction module 800 uses peak windowing to reduce the peak-to-average power ratio of the reverse link signal. The peak-to-average reduction module 800 processes a window of the reverse link signal. In one embodiment, the peak with the largest envelope within the window is reduced.

In one embodiment, the window is an inverted-raised cosine window. In one embodiment, the inverted-raised cosine window is defined as $1-\alpha(\cos^2(x))$ where, $$x = \left(-\frac{\pi}{2} + \frac{\pi}{w}, \frac{\pi}{2}\right),$$

in step sizes equal to $$\frac{\pi}{w}$$

and "w" is the length of the window, i.e., window size. The window is "w" samples long.

In one embodiment, a power reduction algorithm implemented by the peak-to-average reduction module 800 comprises six basic steps. In step one, a target peak-to-average (dB), $P_{target}$, is selected. In step two, average power $P_{av}$ based on a reverse link configuration is calculated. In step three, steps four and five are repeated every "w" samples. In steps four and five, baseband IQ samples for the current "w" samples are modified based on a modified envelope.

In step four, a maximum peak-to-half-slot-average for a "window_size", $P_{hs\_max}$, is calculated. $E_{av}$ is an average envelope value corresponding to the average power $P_{av}$. $E_{av}$ is calculated using the average power $P_{av}$. $E_{hs\_max}$ is an envelope value corresponding to the maximum peak-to-half-slot-average $P_{hs\_max}$. $E_{hs\_max}$ is calculated using the maximum peak-to-half-slot-average $P_{hs\_max}$.

$P_{current\_max}$ and $E_{current\_max}$ are the maximum peak-to-average power ratio and maximum envelope for the current "w" samples, respectively.

In step five, if the maximum peak-to-average power ratio is greater than the target peak-to-average power ratio, (if $(P_{current\_max} > P_{target})$), then a power reduction function, $P_{redn}$, is calculated as an inverted raised cosine.

In one embodiment, $P_{redn}$ is set to $1-\alpha(\cos^2 X)$, where $$a = \left(\frac{E_{current\_max} - E_{av}}{E_{current\_max}}\right).$$

The coefficient "a" scales the power reduction function. The coefficient "a" yields a magnitude for the power reduction function based on the difference between the envelope value for the current "w" samples and the envelope value for the average power. The power reduction function $P_{redn}$ is a peak reduction function for the current "w" samples being processed by the power reduction algorithm.

$E_{mod}$ is a modified envelope for the current "w" samples post peak-to-average reduction. The modified envelope $E_{mod}$ is a product of the maximum envelope $E_{current\_max}$ and the power reduction function $P_{redn}$ ($E_{mod} = E_{current\_max} \cdot P_{redn}$).

In step six, steps four and five are repeated until no sample has a peak above the desired target peak. Thus, multiple passes through the peak-reduction function are performed until a desired target peak-to-average power ratio is achieved.

Figure 8:
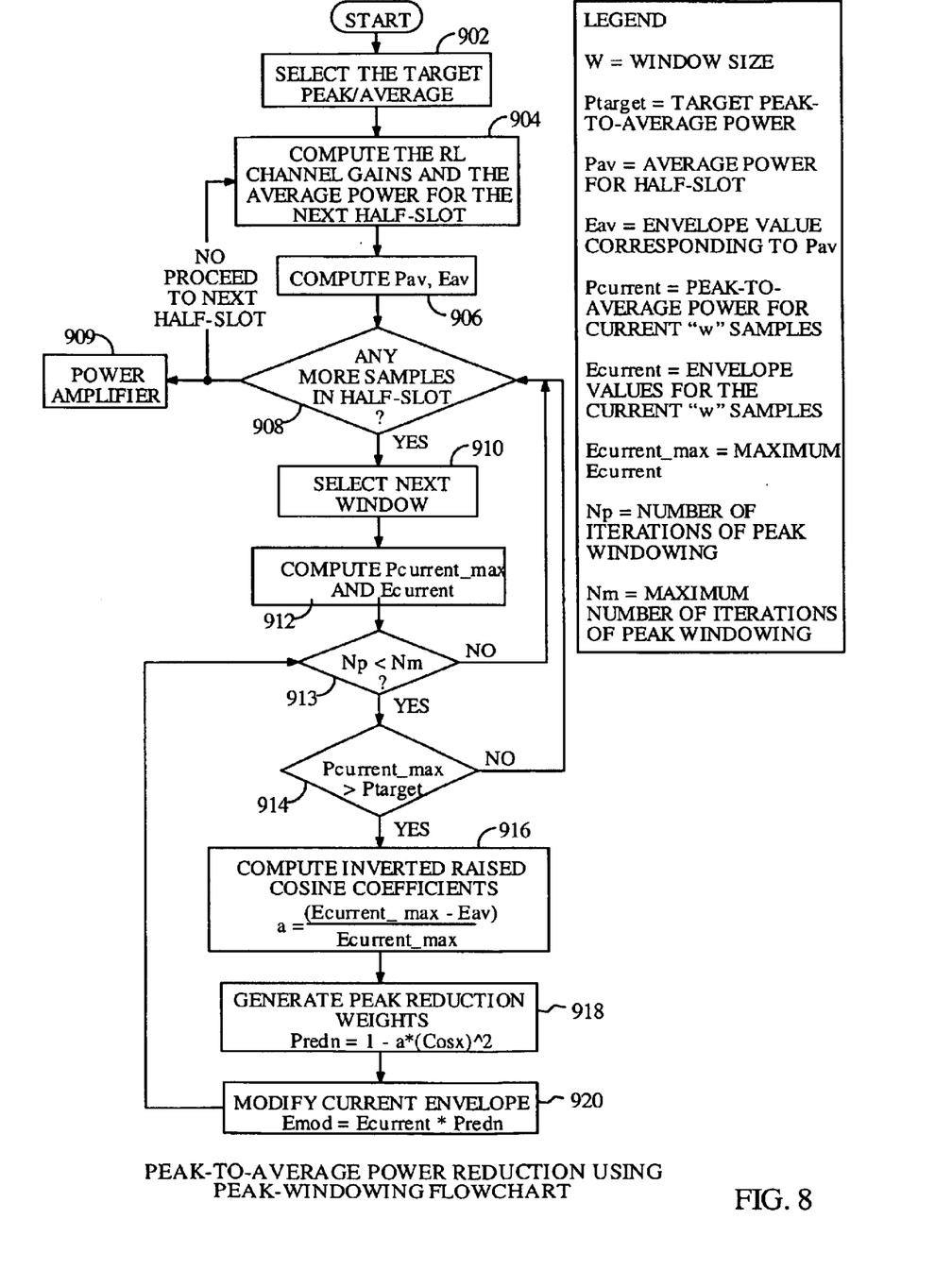
FIG. 8 shows a flowchart for peak windowing in accordance with one embodiment.

FIG. 8 shows a flowchart for peak windowing in accordance with one embodiment. The peak reduction is performed such that the maximum reduction is for the chips that result in the envelope deviating the most relative to the desired envelope (determined by the target peak-to-average power ratio).

In step 902, a target peak-to-average power ratio $P_{target}$ in dB is selected. Since the determination of which channels to transmit in the next half-slot is made before the start of the half-slot, the average power transmitted (based on chosen configuration) is known at this time by a subscriber unit digital signal processor within the transmit data processor 212 in accordance with one embodiment. In step 904, for the next half-slot, reverse link channel gains for each channel are calculated.

In step 906, average power for the next slot, $P_{av}$, and an envelope value, $E_{av}$, corresponding to $P_{av}$ are calculated. Average power $P_{av}$ is calculated based on reverse link configuration. $P_{av}$ is calculated using a traffic-to-pilot ratio, a DRC-to-pilot ratio, an acknowledgment-to-pilot ratio, pilot power, and number of chips from the traffic channel, pilot channel, acknowledgment channel, and data request channel per half slot. Envelope value $E_{av}$ is calculated using the average power $P_{av}$.

In step 908, a test is made to determine whether there are any more samples in the half-slot. If there are no more samples in the half-slot, then in step 909, the samples are provided to the power amplifier 816, and the flow of control goes to step 904. If there are more samples in the half-slot, then another window is selected in step 910. In step 912, $P_{current\_max}$ and $E_{current}$ are calculated. $P_{current\_max}$ and $E_{current\_max}$ are the peak-to-average power ratio and envelope values for the current "w" samples, respectively. In step 913, $N_p$, the number of iterations of peak windowing, is checked to determine whether it is less than $N_m$, the maximum number of iterations of peak windowing. If the number of iterations of peak windowing is not less than the maximum number of iterations of peak windowing, then the flow of control goes to step 908. If the number of iterations of peak windowing is less than the maximum number of iterations of peak windowing, then in step 914, $P_{current\_max}$ is compared to $P_{target}$. $P_{current\_max}$ is the maximum peak-to-average power ratio for the current w samples. If $P_{current\_max}$ is not greater than $P_{target}$, then the flow of control goes to step 908. If $P_{current\_max}$ is greater than $P_{target}$, then inverted raised cosine coefficients are calculated in step 916 in accordance with the following equation:

$$a = \left(\frac{E_{current\_max} - E_{av}}{E_{current\_max}}\right).$$

In step 918, peak reduction function $P_{redn}$ is calculated. $P_{redn}$ is a peak reduction function for the current "w" samples and is set to $1-\alpha(\cos^2 X)$. In step 920, a modified envelope, $E_{mod}$, for the current "w" samples post peak-to-average reduction is calculated. $E_{mod}$ is set to $E_{current} \times P_{redn}$. $E_{mod}$ is a sample-by-sample multiplication of current samples $E_{current}$ and peak reduction window $P_{redn}$.

Only when there are no more samples in the current half-slot does the flow of control go to step 909, and the samples are provided to the transmitter's 216 power amplifier 316. The samples are continuously provided to the transmitter's 216 power amplifier 316.

In step 920, a check is made to determine whether any sample in the window has a peak above the desired target peak. Thus, multiple passes through the peak-reduction function are performed until a desired target peak-to-average power ratio is achieved. If the current sample peak is above the desired target peak, then the flow of control goes to the next set of w samples, i.e., N is incremented in step 924, and the flow of control goes to step 908. If the current sample peak is at or below the desired target peak, then the peak windowing algorithm terminates. The resultant samples are provided to the power amplifier 316 of the transmitter 216.

Method steps can be interchanged without departing from the scope of the invention. While an embodiment uses time slots, it should be noted that the teachings of this innovation do not require that the peak windowing algorithm be time slotted and are thus applicable to systems, which are not slotted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both.

Interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), or other processor, an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal (presumably previously defined broadly). In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a peak-to-average reduction module, wherein the reduction module is an inverted raised cosine function and wherein the inverted raised cosine is $1-\alpha(\cos^2 x)$, where $$a = \left( \frac{E_{\text{current\_max}} - E_{av}}{E_{\text{current\_max}}} \right),$$

$E_{av}$ is average power for a current period, and $E_{\text{current\_max}}$ is a maximum value of the signal's envelope for a current window that is configured to generate a reduced peak-to-average signal, in response to a peak in a signal that exceeds a target threshold value, by applying a reduction function continually to the peak and terminating the application of the reduction function when the peak is reduced to or below the target threshold value; and
a power amplifier that is configured to amplify the reduced peak-to-average signal.

2. The apparatus of claim 1, wherein the application of the reduction function is terminated when the reduction function has been applied a given number of times.

3. The apparatus of claim 1, wherein the apparatus is a subscriber unit.

4. The apparatus of claim 1, wherein the signal is a CDMA signal.

5. The apparatus of claim 1, wherein the period is a half-slot.

6. An apparatus, comprising:
a reverse link modulator configured to provide channel data;
a channel gain calculation module coupled to said reverse link modulator and configured to calculate reverse link channel gain;
an averaging module that is coupled to said channel gain calculation module and configured to calculate average power of channels on the reverse link;
a threshold module coupled to said averaging module and configured to generate envelope thresholds using a target peak-to-average ratio of the signal and said average power;
a window weight module coupled to said threshold module and configured to align a window with a signal peak and generate window weights to be used for multiplying with filtered samples;
a filter coupled to said reverse link modulator and configured to filter an n-chip (where n is an integer) sample of channel data to generate filtered samples; and
a multiply module coupled to said filter and configured to multiply the filtered samples with an aligned peak window using the window weights from the window weight module, to create modified samples with a reduced peak-to-average power ratio.

7. A method of processing a signal, comprising:
comparing a peak of the signal to a target threshold value; and
applying a reduction function, wherein the reduction function is an inverted raised cosine function and wherein the inverted raised cosine is $1-\alpha(\cos^2 x)$, where $$a = \left( \frac{E_{\text{current\_max}} - E_{av}}{E_{\text{current\_max}}} \right),$$

$E_{av}$ is average power for a current period, and $E_{\text{current\_max}}$ is a maximum value of the signal's envelope for a current window continually to the peak if the peak is above the target threshold value to generate a reduced peak-to-average signal; and
terminating the application of the reduction function when the peak is at or below the target threshold value.

8. The method of claim 7, further comprising terminating application of the reduction function once the reduction function has been applied a given number of times.

9. The method of claim 7, further comprising amplifying the reduced peak-to-average signal to generate an amplified signal.

10. The method of claim 7, wherein the signal is a CDMA signal.

11. The method of claim 7, wherein the method is performed by a subscriber unit.

12. The method of claim 9, further comprising transmitting the amplified signal.

13. A method of processing a signal, comprising:
calculating a gain value for the signal on a reverse link;
calculating average power levels of channels on the reverse link;
generating envelope thresholds using a target peak-to-average ratio of the signal and the average power levels;
aligning a window with a peak of the signal;
generating window weights for multiplying with filtered samples of the signal;
filtering an n-chip (where n is an integer) sample of channel data to generate the filtered samples; and
multiplying the filtered samples with an aligned peak window using the window weights to create modified samples with a reduced peak-to-average power ratio.

* * * * *